United States Patent [19]

Friesen et al.

[11] Patent Number: 4,883,593

[45] Date of Patent: Nov. 28, 1989

[54] ULTRATHIN-SKINNED ASYMMETRIC MEMBRANES BY IMMISCIBLE SOLVENTS TREATMENT

[75] Inventors: Dwayne T. Friesen; Walter C. Babcock, both of Bend, Oreg.

[73] Assignee: Bend Research, Inc., Bend, Oreg.

[21] Appl. No.: 263,368

[22] Filed: Oct. 27, 1988

[51] Int. Cl.$^4$ ............................................. B01L 13/00
[52] U.S. Cl. ................................. 210/500.32; 55/158; 210/500.31; 210/500.30; 210/500.29; 264/41
[58] Field of Search ........... 210/500.29, 500.3, 500.31, 210/500.32; 55/16, 158; 264/41; 427/244, 245, 246

[56] References Cited

U.S. PATENT DOCUMENTS 3,592,672 7/1971 Rowley et al. ............. 210/500.29 X
3,772,072 11/1973 Brown et al. .............. 210/500.29 X

*Primary Examiner*—Frank Spear

[57] ABSTRACT

Improved semipermeable asymmetric fluid separation membranes useful in gas, vapor and liquid separations are disclosed. The membranes are prepared by substantially filling the pores of asymmetric cellulosic semipermeable membranes having a finely porous layer on one side thereof with a water immiscible organic liquid, followed by contacting the finely porous layer with water.

9 Claims, No Drawings

ULTRATHIN-SKINNED ASYMMETRIC MEMBRANES BY IMMISCIBLE SOLVENTS TREATMENT

The government has rights in this invention under Contract No. DE-AC03-84ER80159 awarded by the Department of Energy.

BACKGROUND OF THE INVENTION

Cellulosic asymmetric "skinned" fluid separation membranes are known. See Lee U.S. Pat. No. 4,527,999. It is also known that the flux or fluid rate of flow through such membranes is inversely proportional to the thickness of the skin or thin, finely porous surface layer thereof. For this reason, it is highly desireable to fabricate such asymmetric membranes with as thin a skin layer as possible. In the above-mentioned U.S. Pat. No. 4,527,999 there is disclosed a method of casting a cellulose acetate asymmetric membrane and post-treating the same with a nonsolvent such as heptane, the heptane containing in solution a minor amount of a swelling agent such as water, followed by drying the treated membrane while constraining the side opposite the skinned side, the constraint taking place by the membrane adhering to a glass substrate. However, the so-prepared membranes still suffer from very poor selectivity.

The present invention provides a simple and efficient method of obtaining high flux, highly selective asymmetric cellulosic fluid separation membranes.

SUMMARY OF THE INVENTION

The present invention comprises a process of making an asymmetric fluid separation membrane having an ultrathin dense layer, on at least one surface thereof, comprising:
(a) substantially filling the pores of an asymmetric cellulosic semipermeable membrane having a finely porous layer on at least one surface thereof with a water immiscible organic liquid, followed by
(b) contacting said finely porous layer of said cellulosic semipermeable membrane with water.

DETAILED DESCRIPTION OF THE INVENTION

According to the present invention, there is provided an improved semipermeable asymmetric cellulosic fluid separation membrane useful in gas, vapor and liquid separations, the membrane having an ultrathin, dense skin layer and exceptionally high flux and selectivity. Such membranes are prepared by a two-step process comprising first substantially filling the pores of an asymmetric cellulosic semipermeable membrane having a finely porous layer on one or two sides with a water immiscible organic liquid, followed by contacting the finely porous layer(s) with water.

The underlying asymmetric cellulosic membrane may be formed from virtually any cellulosic material, such as regenerated cellulose, ethyl cellulose, cyanoethylated cellulose, hydroxypropyl cellulose, cellulose acetate, cellulose diacetate, cellulose triacetate, cellulose propionate, cellulose butyrate, cellulose acetate butyrate, cellulose nitrate, and blends thereof.

The function of the water immiscible organic liquid is to occupy the inner, larger pores of the asymmetric membrane while maintaining them open, at the same preventing entry thereinto by water. The only functional requirements of the organic liquid are that it be water immiscible and not attack the cellulosic membrane. Another desireable, but not essential, characteristic is that it be relatively volatile for rapid evaporation following treatment. Suitable organic liquids include alkanes, alkenes, aromatics and halogen-substituted derivatives thereof. Generally speaking, solvents having solubility parameters low enough not to swell or dissolve cellulosics will work in the present invention, i.e., parameters of $\leq 9.0 \ [cal/cm^3\text{-atm}]^{1/2}$.

The second step of contacting the finely porous surface layer with water is to collapse the surface pores, making an ultrathin dense skinned layer on the asymmetric membrane. Because the inner pores substantially filled with the water immiscible organic liquid, the pore collapse is limited to the surface layer. Contact of this layer by water may be by dipping or spraying, preferably the latter. To improve wettability, inclusion of a minor amount of surfactant, from 0.01 to 0.2 wt %, is preferred. A preferred rate of contacting the finely porous layer with water is from 2 to 10 ml per square foot of finely porous surface area.

The so-prepared membranes are useful in all manner of fluid separations, including gas separations, vapor separations, and liquid separations such as reverse osmosis.

EXAMPLES 1-3

Six open, highly porous flat sheet cellulose acetate (CA)/cellulose triacetate (CTA) membranes having a graduation of pore sizes from relatively large (1-100 microns in diameter) on one surface to relatively small (0.01-0.1 micron in diameter) at the other surface were cast by conventional techniques at 4 ft/min from a casting dope having components in the following ratios: dioxane:acetone 6.75; solvent:cellulosics 4.5; and methanol:cellulosics 0.8. The cast membranes were annealed in a 70° C water bath and dried by solvent exchange.

To create a thin dense skin on three of the CA/CTA membranes (hereafter referred to as "treated" membranes), they were immersed in the water immiscible organic liquid hexane to substantially fill their pores therewith, and allowed to dry from 5 to 15 seconds, followed immediately by spraying the finely porous surfaces with atomized water containing 0.1 wt. % surfactant (OP-10) made by BASF Wyandotte Corporation of Parsippany, N.J.) at a rate of about 13 moving past the spray nozzle at 2 to 3 ft/min, thus producing a water flow rate of 4 to 5 ml/ft$^2$ of membrane surface area. Following the wetting step, both the pore-filling hexane and surface water spray were evaporated by blowing dry air across the membrane, producing three asymmetric CA/CTA membranes having a dense of nonporous "skin" layer on one side thereof about 0.01 micron thick.

The three treated membranes (designated as Nos. 1-3) were treated for gas permeability and compared with the other three untreated CA/CTA membranes (designated as Nos. U1-U3), with results shown in Table I.

TABLE I

| Membrane No. | Permeability (SCFH/ft$^2$-100 psi) | | | | Selectivity | |
|---|---|---|---|---|---|---|
| | $CO_2$ | $CH_4$ | $O_2$ | $N_2$ | $CO_2/CH_4$ | $O_2/N_2$ |
| 1 | 25.6 | 0.883 | 3.26 | 0.773 | 28.9 | 4.2 |
| 2 | 22.9 | 0.721 | 2.99 | 0.650 | 31.7 | 4.0 |

TABLE I-continued

| Membrane No. | Permeability (SCFH/ft²-100 psi) | | | | Selectivity | |
|---|---|---|---|---|---|---|
| | $CO_2$ | $CH_4$ | $O_2$ | $N_2$ | $CO_2/CH_4$ | $O_2/N_2$ |
| 3 | 22.7 | 0.693 | 2.89 | 0.615 | 32.8 | 4.7 |
| U1 | 54.3 | 59.4 | 43.2 | 44.2 | 0.90 | 0.97 |
| U2 | 51.0 | 52.4 | 38.6 | 39.0 | " | " |
| U3 | 62.1 | 73.0 | 52.3 | 54.5 | " | " |

By comparison, and using the same units of measurement, commercially available CA/CTA membranes typically have $CO_2$ permeabilities ranging from 5–10 and $CO_2/CH_4$ selectivities of 20–30.

EXAMPLES 4–7

Four additional membranes were prepared and treated in substantially the same manner as in Examples 1–3, varying the casting compositions of the underlying CA/CTA dope and increasing the casting speed of membrane No. 7 and tested for gas permeability, with the results shown in Table II.

TABLE II

| Membrane No. | Permeability (SCFH/ft²-100 psi) | | | | | Selectivity | | |
|---|---|---|---|---|---|---|---|---|
| | $CO_2$ | $CH_4$ | $O_2$ | $N_2$ | $H_2$ | $CO_2/CH_4$ | $O_2/N_2$ | $H_2/CH_4$ |
| 4 | 19.0 | 0.42 | 2.0 | 0.4 | — | 44.8 | 4.8 | — |
| 5 | 22.3 | 1.60 | 3.7 | 1.4 | 38.0 | 13.9 | 2.6 | 24.0 |
| 6 | 13.1 | 0.57 | 2.1 | 0.5 | 25.6 | 22.8 | 4.4 | 44.6 |
| 7 | 17.4 | 1.01 | 2.9 | 0.9 | 32.8 | 17.2 | 3.1 | 32.5 |

EXAMPLES 8–10

Three additional membranes were prepared and treated in substantially the same manner as in Examples 1—3, varying the water presure noted in Table III, with the permeasbility and selectivity test results shown in Table III.

TABLE III

| Membrane No. | $H_2O$ Pressure (psi) | Permeability (SCFH/ft²-100 psi) | | | | Selectivity | |
|---|---|---|---|---|---|---|---|
| | | $CO_2$ | $CH_4$ | $O_2$ | $N_2$ | $CO_2/CH_4$ | $O_2/N_2$ |
| 8 | 10 | 19.0 | 0.42 | 1.96 | 0.41 | 44.8 | 4.84 |
| 9 | 20 | 18.9 | 0.47 | 2.11 | 0.44 | 40.0 | 4.85 |
| 10 | 30 | 19.3 | 0.46 | 2.17 | 0.43 | 41.9 | 5.01 |

EXAMPLES 11–16

Six additional membranes were prepared and treated in substantially the same manner as in Examples 1–3, increasing the amount of surfactant to 0.2 wt. % and varying the pressure as noted in Table IV, with the permeability and selectivity test results shown in Table IV.

EXAMPLES 17–22

Six additional membranes were prepared and treated in substantially the same manner as in Examples 1–3, varying the casting dope compositions, with the permeability and selectivity test results shown in Table V.

TABLE IV

| Membrane No. | $H_2O$ Pressure (psi) | Surfactant | Permeability (SCFH/ft²-100 psi) | | | | Selectivity | |
|---|---|---|---|---|---|---|---|---|
| | | | $CO_2$ | $CH_4$ | $O_2$ | $N_2$ | $CO_2/CH_4$ | $O_2/N_2$ |
| 11 | 10 | 0 | 12.3 | 0.44 | 1.57 | 0.35 | 28.3 | 4.5 |
| 12 | 20 | 0 | 8.3 | 0.22 | 1.05 | 0.19 | 38.2 | 5.6 |
| 13 | 30 | 0 | 4.0 | 0.10 | 0.46 | 0.08 | 40.4 | 5.6 |
| 14 | 10 | 0.1 | 23.5 | 0.71 | 2.59 | 0.56 | 33.2 | 4.6 |
| 15 | 20 | 0.1 | 17.5 | 1.12 | 2.38 | 0.79 | 15.6 | 3.0 |
| 16 | 30 | 0.1 | 17.5 | 2.46 | 3.36 | 1.84 | 7.1 | 1.8 |

TABLE V

| Membrane No. | Permeability (SCFH/ft²-100 psi) | | | | Selectivity | |
|---|---|---|---|---|---|---|
| | $CO_2$ | $CH_4$ | $O_2$ | $N_2$ | $CO_2/CH_4$ | $O_2/N_2$ |
| 17 | 11.7 | 0.29 | 1.43 | 0.26 | 41 | 5.5 |
| 18 | 12.6 | 0.31 | 1.50 | 0.27 | 41 | 5.6 |
| 19 | 12.2 | 0.34 | 1.54 | 0.29 | 36 | 5.4 |
| 20 | 8.7 | 0.23 | 1.11 | 0.20 | 38 | 5.6 |
| 21 | 11.0 | 0.31 | 1.45 | 0.27 | 36 | 5.5 |
| 22 | 13.0 | 0.38 | 1.70 | 0.31 | 35 | 5.5 |

EXAMPLE 23

Twelve membranes of the present invention were prepared in substantially the same manner an in Example 1–3. Six were treated as specified in Examples 1–3, while six were untreated. All of the membranes were then RO-tested with aqueous feed solutions of 4500 ppm magnesium sulfate and 5000 ppm sodium chloride, both tests at a transmembrane pressure of 800 psi, a flow rate of 1.9 L/min. 25° C. and pH 5. The averaged results of treated and untreated membranes are shown in Table VI.

TABLE VI

| Membrane Type | $MgSO_4$ | | NaCl | |
|---|---|---|---|---|
| | $H_2O$ Flux* | % Rejection | $H_2O$ Flux* | % Rejection |
| Untreated | 15.8 | 95.5 | 15.0 | 90.2 |
| Treated | 17.2 | 98.7 | 15.9 | 94.2 |

*gallons/ft²/day

As is apparent, in both cases, treatment resulted in increase of both flux and rate of rejection.

EXAMPLE 24

To demonstrate the importance of the water contacting step of the process of the present invention, a sheet of CA/CTA membrane material was prepared in substantially the same manner as in Examples 1—3, varying the casting dope composition, and 18 membrane discs were stamped therefrom and divided into three lots of 6 each. One lot was untreated, one was immersed in hexane containing 0.5 wt. % water and allowed to air dry, and the third was spray-treated in the same manner as in Examples 1—3. All of the membranes were then tested for selectivity in separation of the same gases tested in previous Examples. The averaged results are shown in Table VII.

TABLE VII

| Membrane | Selectivity | |
| --- | --- | --- |
| Type | $CO_2/CH_4$ | $O_2/N_2$ |
| Untreated | 0.7 | 0.9 |
| Hexane contg. water | 0.8 | 1.0 |
| Treated | 7.6 | 2.1 |

As the results show, the membranes treated in accordance with the present invention, by virtue of their selectivities, exhibited superior gas reparation capability.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A process of making an asymmetric fluid separation membrane having an ultrathin dense layer on at least one surface thereof, comprising:
    (a) substantially filling the pores of an asymmetric cellulosic semipermeable membrane having a finely porous layer on at least one surface thereof with a water immiscible organic liquid; and, while the pores of said membrane are still substantially filled with said water immiscible organic liquid,
    (b) contacting said finely porous layer of said cellulosic semipermeable membrane with water.

2. The process of claim 1 wherein said asymmetric cellulosic semipermeable membrane is formed from cellulosic materials selected from regenerated cellulose, ethyl cellulose, cyanoethylated cellulose, hydroxypropyl cellulose, cellulose acetate, cellulose diacetate, cellulose triacetate, cellulose propionate, cellulose butyrate, cellulose acetate butyrate, cellulose nitrate, and blends thereof.

3. The process of claim 1 wherein said water immiscible organic liquid is selected from aliphatic hydrocarbons containing from 5 to 15 carbon atoms.

4. The process of claim 3 wherein said aliphatic hydrocarbon is hexane.

5. The process of claim 1 wherein said water contains a surfactant.

6. The process of claim 5 wherein said surfactant is present from 0.01 to 0.2 wt %.

7. The process of claim 1 wherein the rate of contacting said finely porous layer with water is from 2 to 10 ml/ft$^2$.

8. The process of claim 1 wherein the method of contacting said finely porous layer with water is by spraying.

9. The asymmetric fluid separation membrane prepared by the process of claim 1, 2, 3, 4, 5, 6, 7 or 8.

* * * * *

UNITED STATES PATENT AND TRADEMARK OFFICE
CERTIFICATE OF CORRECTION

PATENT NO. : 4,883,593
DATED : November 28, 1989
INVENTOR(S) : Dwayne T. Friesen, Walter C. Babcock It is certified that error appears in the above-identified patent and that said Letters Patent is hereby corrected as shown below:

Column 1, line 67, insert "time" after the word "same."

Column 3, line 50, change "presure" to -- pressure --.

Column 3, line 52, change "permeasbility to -- permeability --.

Column 4, Table IV, under the column entitled Surfactant, change "0.1" to -- 0.2 --.

Column 4, Table IV, under the column entitled Surfactant, change "0.1" to -- 0.2 --.

Column 4, Table IV, under the column entitled Surfactant, change "0.1" to -- 0.2 --.

Column 5, line 19, change "reparation" to -- separation --.

Signed and Sealed this

Seventh Day of December, 1993

Attest:

BRUCE LEHMAN

Attesting Officer

Commissioner of Patents and Trademarks